(12) United States Patent
Yoon

(10) Patent No.: US 9,170,354 B2
(45) Date of Patent: Oct. 27, 2015

(54) RETROREFLECTIVE SHEET AND FABRICATION METHOD THEREOF

(75) Inventor: Se Won Yoon, Gyeonggi-do (KR)

(73) Assignee: HJ CORP, Gyeonggi-do (KR)

( * ) Notice: Subject to any disclaimer, the term of this patent is extended or adjusted under 35 U.S.C. 154(b) by 450 days.

(21) Appl. No.: 13/615,100

(22) Filed: Sep. 13, 2012

(65) Prior Publication Data

US 2014/0022641 A1    Jan. 23, 2014

(30) Foreign Application Priority Data

Jul. 20, 2012  (KR) .......................... 10-2012-0079498

(51) Int. Cl.
*G02B 5/128* (2006.01)

(52) U.S. Cl.
CPC ..................... *G02B 5/128* (2013.01)

(58) Field of Classification Search
CPC ...................................... G02B 5/128
See application file for complete search history.

(56) References Cited

U.S. PATENT DOCUMENTS

2010/0124632 A1*   5/2010   Hannington ................... 428/142

\* cited by examiner

*Primary Examiner* — Jennifer L. Doak
(74) *Attorney, Agent, or Firm* — IP & T Group LLP

(57) ABSTRACT

A retroreflective sheet and a fabrication method thereof are provided, the retroreflective sheet including a base, a bonding layer formed on the base, a colored layer formed to be thicker in a non-reflective region NRA2 than in a reflective region RA2 to have a concavo-convex surface on the bonding layer, and having a fluorescent function or a phosphorescent function or having the both fluorescent and phosphorescent functions, a reflective layer formed in the concave portion of the reflective region RA2 on the surface of the colored layer, and a light concentrating layer having a plurality of beads aligned therein on the reflective layer. Thus, since a step is not generated between the reflective region and the non-reflective region, the light reflective member can be prevented from being delaminated from the body when used, and also, the light reflective member can be simply formed in the reflective region of the colored layer.

8 Claims, 4 Drawing Sheets

RETROREFLECTIVE SHEET AND FABRICATION METHOD THEREOF

CROSS-REFERENCE TO RELATED APPLICATIONS

The present application claims priority of Korean Patent Application No. 10-2012-0079498, filed on Jul. 20, 2012, which is incorporated herein by reference in its entirety.

FIELD OF THE INVENTION

The present invention relates to a retroreflective sheet and fabrication method thereof, and more particularly, to a retroreflective sheet that does not have a step between a reflective region and a non-reflective region, and a fabrication method thereof.

BACKGROUND OF THE INVENTION

A retroreflective sheet is a reflector that reflects incident light in a direction in which the light is made incident as it is. The retroreflective sheet is processed to have a desired shape and pattern on a body surface in a form of a sheet and attached to a traffic sign or a selected portion of a uniform of a fireman and so on, with an adhesive or through sewing or the like, having enhanced visibility, so as to be easily viewed or recognized even in a dark environment. Thus, when the retroreflective sheet is attached to clothes worn by people, who work on the roads or in a dangerous place, such as sweepers, firemen, policemen, factory workers, construction crew, safety men and so on, a location of a wearer can be clearly recognized by those around, obtaining a great effect in terms of protection and safety of the wearer.

The retroreflective sheet is formed to have a stripe pattern that a reflective region reflecting incident light and a colored fluorescent region are alternated on a base. The reflective region is configured as a light concentration layer formed by attaching beads to a reflective layer deposited with a metal such as aluminum or the like, and the fluorescent region is configured as a fluorescent material layer coated with an organic binder including fluorescent pigment.

FIG. 1 is a cross-sectional view of a conventional retroreflective sheet.

The conventional retroreflective sheet is formed to have reflective regions RA1 and non-reflective regions NRA1 alternated in a stripe shape. In the retroreflective sheet, a bonding layer 13 and a colored layer 15 are sequentially stacked on a base 11, and light reflective members 23 each consisting of a reflective layer 17 and a light concentrating layer 21 are formed to be alternated in a stripe pattern on the colored layer 15. A portion in which the light reflective member 23 is the reflective region RA1 and the other remaining portions exposing the colored layer 15 without having the light reflective member 23 is the non-reflective region NRA1.

The reflective layer 17 is formed by depositing a metal, such as aluminum or the like, having excellent light reflective characteristics on a lower surface of the light concentrating layer 21 including a plurality of beads 19 to concentrate (or condense) incident light, and reflects light.

The retroreflective sheet having the foregoing configuration reflects incident light by the light reflective members 23 formed in the reflective regions RA1 to easily recognize it on its periphery even at night or in a dark area. That is, in the light reflective member 23 consisting of the light concentrating layer 21 and the reflective layer 17, the light concentrating layer 21 concentrates incident light and the reflective layer 17 reflects concentrated light, emitting light in a stripe pattern, whereby the retroreflective sheet can be easily recognized around it even at night with a small amount of light or although it is located in a dark area.

FIGS. 2A to 2E are views illustrating a process of fabricating a retroreflective sheet according to the prior art.

Referring to FIG. 2A, a bid alignment layer 27 is formed on a carrier film 25. The carrier film 25 is formed as general paper or the like, and the bead alignment layer 27 is made of a synthetic resin having viscosity characteristics.

Further, the light concentrating layer 21 is formed by sprinkling a plurality of beads 19 on the entire surface of the bead alignment layer 27 such that the plurality of beads 19 form a layer. Here, the plurality of beads 19 are made of a transparent non-vitreous ceramic or a transparent synthetic resin, and fixed to the bead alignment layer 27 having viscosity characteristics such that they do not move, to form the light concentrating layer 21.

Subsequently, a metal such as aluminum (Al), silver (Ag), copper (Cu), zinc (Zn), tin (Sn) or the like having excellent light reflecting characteristics is deposited on the light concentrating layer 21 to form the reflective layer 17. The light concentrating layer 21 and the reflective layer 17 constitute the light reflective member 23.

Referring to FIG. 2B, the structure in which the bead alignment layer 27 and the light reflective member 23 consisting of the light concentrating layer 21 and the reflective layer 17 are sequentially stacked on the carrier film 25 is cut to have a strip pattern with a certain width RA1.

Referring to FIG. 2C, the bonding layer 13 and the colored layer 15 are sequentially stacked on the base 11, separately from the process of FIGS. 2A and 2B. The colored layer 15 may have a fluorescent function or a phosphorescent function or may have the both functions.

Referring to FIG. 2D, the structure, in which the bead alignment layer 27 and the light reflective member 23 consisting of the bead alignment layer 27 and the light concentrating layer 17 are sequentially stacked on the carrier film 25, to be cut to have the certain width RA1 in a stripe pattern in FIG. 2B, is attached to the colored layer 15 such that the reflective layer 17 of the light reflective member 23 is bonded to the colored layer 15. Thus, the portions the colored layer 15 to which the reflective layers 17 of the light reflective members 23 of the structure cut to have the certain width RA1 in a stripe pattern are attached become the reflective regions RA1 and the other remaining portions to which the reflective layers of the light reflective members 23 are not attached become non-reflective regions NRA1.

Referring to FIG. 2E, the carrier film 25 and the bead alignment layer 27 are removed. Accordingly, the light concentrating layer 21 of the reflective region RA1 is exposed, completing a retroreflective sheet having the reflective region RA1 and the non-reflective region NRA1 confined therein.

However, in the foregoing retroreflective sheet according to the prior art, since the light reflective member 23 is formed only in the reflective region, not in the non-reflective region, a step is formed between the reflective region and the non-reflective region, causing a problem in which the light reflective member formed in the reflective region is easily delaminated from the body. In addition, since the light reflective member together with the carrier film are cut, attached to the base, and then, the carrier film including the bead alignment layer as a light reflective film is delaminated, the manufacturing process is complicated.

SUMMARY OF THE INVENTION

It is, therefore, an object of the present invention to provide a retroreflective sheet for preventing a light reflective member formed in a reflective region from easily being delaminated from the body.

Another object of the present invention is to provide a method for manufacturing a retroreflective sheet capable of preventing a generation of a step between a reflective region and a non-reflective region due to a light reflective member.

Still another object of the present invention is to provide a method for manufacturing a retroreflective sheet capable of simply forming a light reflective member on a carrier film without performing a cutting operation.

In accordance with one aspect of the present invention, there is provided a retroreflective sheet, including: a base; a bonding layer formed on the base; a colored layer formed to be thicker in a non-reflective region NRA2 than in a reflective region RA2 to have a concavo-convex surface on the bonding layer, and having a fluorescent function or a phosphorescent function or having the both fluorescent and phosphorescent functions; a reflective layer formed in the concave portion of the reflective region RA2 on the surface of the colored layer; and a light concentrating layer having a plurality of beads aligned therein on the reflective layer.

In the above aspect, the bonding layer is formed by one or a mixture of two or more of polyester, polyurethane, poly ethylene vinyl acetate copolymer (EVA), a polyacryl copolymer, PVC, epoxy, olefin-based resin, or phenol-based resin, having bonding characteristics, and further includes a flame retardant such as $Sb_2O_3$, a phosphonic acid material, Or a brome-based material.

The colored layer is formed by an adhesive synthetic resin such as polyurethane, poly ethylene vinyl acetate copolymer (EVA copolymer), polyester, ABS, or a polyacryl copolymer.

The colored layer further includes a fluorescent material or a phosphorescent material, or includes a fluorescent material and a phosphorescent material The colored layer is formed to have the reflective region RA2 and the non-reflective region NRA2 alternated in stripe pattern.

The colored layer is formed to have the reflective region RA2 or the non-reflective region NRA2 having various types of characters, numbers or shapes.

The colored layer is formed to have a thickness ranging from 100 to 500 μm in the non-reflective region NRA2.

In accordance with another aspect of the present invention, there is provided a method for fabricating a retroreflective sheet, including: forming a bead alignment layer on a carrier film and attaching a mask tape in a non-reflective region NRA2 on the bead alignment layer to confine a reflective region RA2 and the non-reflective region NRA2; sprinkling a plurality of beads to the bead alignment layer such that they form a layer to form a light concentrating layer in the reflective region; depositing a metal having excellent light reflecting characteristics on the surface of the mask tape and the light concentrating layer to form a reflective layer; removing the mask tape such that the reflective layer remains on the light concentrating layer and the bead alignment layer of the non-reflective region NRA2 is exposed, and forming a colored layer covering the reflective layer on the exposed bead alignment layer; forming a bonding layer on the colored layer and thermally compressing a base to the bonding layer; and delaminating the carrier film having the bead alignment layer to expose the colored layer and the light concentrating layer.

In the above aspect, the carrier film is formed of polyester.

The bead alignment layer is made of a synthetic resin such as poly ethylene vinyl acetate copolymer (EVA copolymer), poly ethylene acrylic acid copolymer (EAA copolymer), or polyethylene (LDPE, LLDPE, HDPE), polypropylene copolymer.

The mask tape is formed to be alternated in a stripe pattern or attached to have the reflective regions RA2 or the non-reflective regions NRA2 having various types of characters, numbers or shapes.

The plurality of beads is made of glass, transparent non-vitreous ceramic, or a transparent synthetic resin having a size ranging from 20 to 200 μm.

The colored layer is formed by coating an adhesive synthetic resin such as polyurethane, poly ethylene vinyl acetate copolymer (EVA copolymer), polyester, ABS, or a polyacryl copolymer4 to have a thickness ranging from 100 to 500 μm.

The colored layer further includes a fluorescent material or a phosphorescent material.

The colored layer further includes a fluorescent material and a phosphorescent material.

The bonding layer is formed by one or a mixture of two or more of polyester, polyurethane, poly ethylene vinyl acetate copolymer (EVA), a polyacryl copolymer, PVC, epoxy, olefin-based resin, or phenol-based resin, having bonding characteristics, and further includes a flame retardant such as $Sb_2O_3$, a phosphonic acid material, or a brome-based material.

The base is made of flame-retardant all-cotton fiber, glass fiber, aramid fiber, hemp fiber, wool fiber, polyester fiber, or cotton blend (TC) fiber.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with the accompanying drawings.

Figure 1:
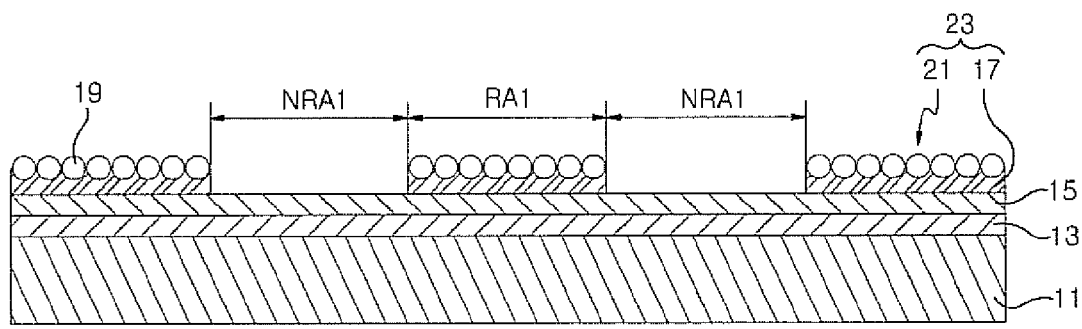
FIG. 1 is a cross-sectional view of a retroreflective sheet according to the prior art.
Figure 2A:
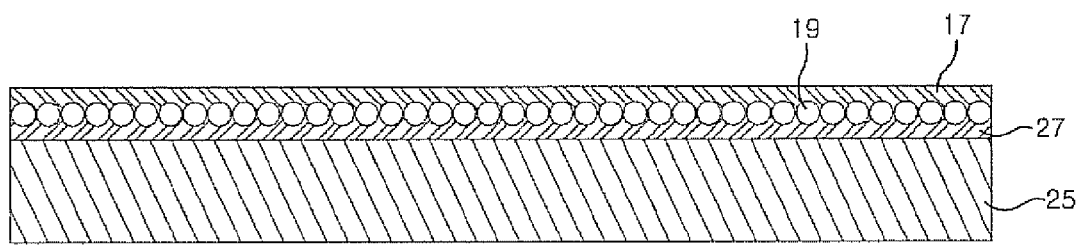
FIGS. 2A to 2E are views illustrating a process of manufacturing the retroreflective sheet according to the prior art.
Figure 2B:
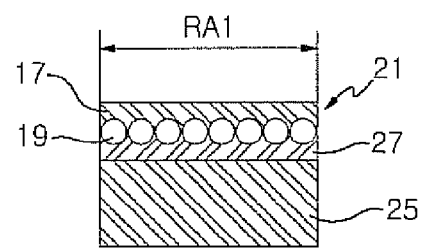
Figure 2C:
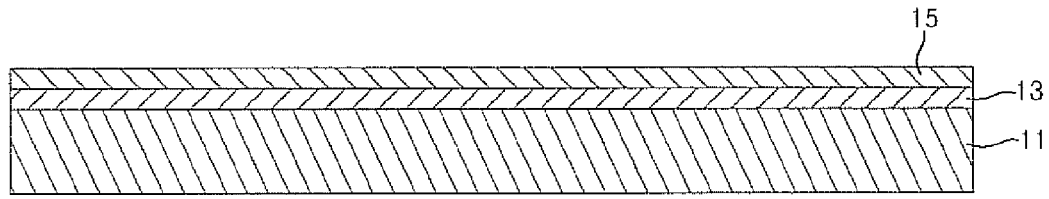
Figure 2D:
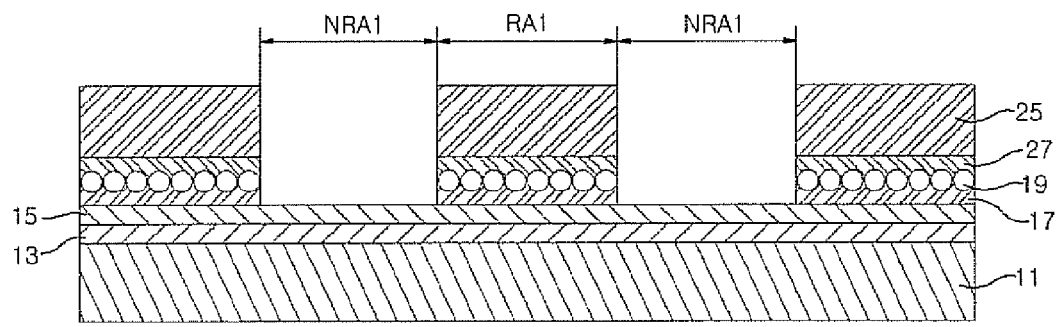
Figure 2E:
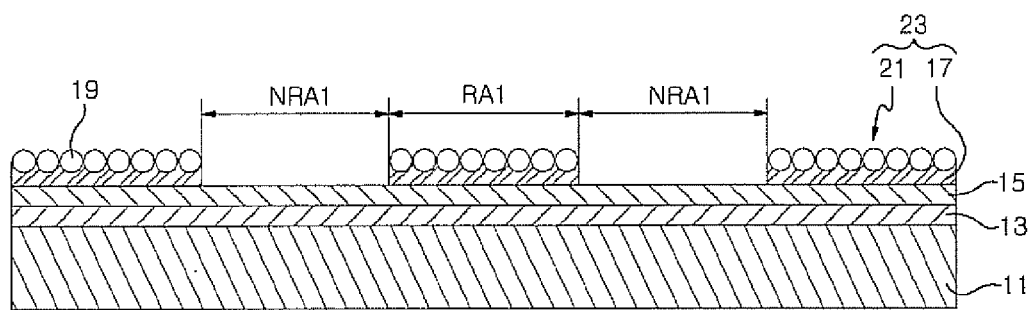
Figure 3:
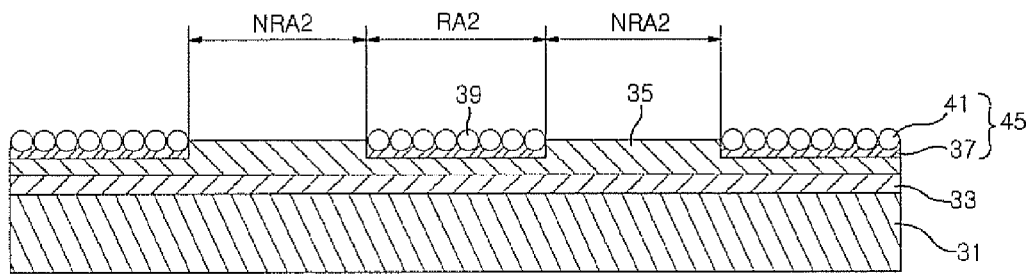
FIG. 3 is a cross-sectional view of a retroreflective sheet in accordance with an embodiment of the present invention.

FIG. 3 is a cross-sectional view of a retroreflective sheet in accordance with an embodiment of the present invention.

A retroreflective sheet in accordance with the present invention includes a base 31, a bonding layer 33, a colored layer 35, a reflective layer 37, and a light concentrating layer 41, and reflective regions RA2 and non-reflective regions NRA2 are formed to be alternated in a stripe pattern. The reflective layer 37 and the light concentrating layer 41 constitute a light reflective member 45.

The base 31 is made of flame-retardant all-cotton fiber, glass fiber, aramid fiber, hemp fiber, wool fiber, polyester fiber, cotton blend (TO) fiber, or the like.

The bonding layer 33 is formed by coating one or a mixture of two or more of adhesive synthetic resins having excellent heat resistance such as polyester, polyurethane, poly ethylene vinyl acetate copolymer (EVA), a polyacryl copolymer, PVC, epoxy, olefin-based resin, phenol-based resin and the like having a flame retardant such as $Sb_2O_3$, a phosphonic acid material, a brome-based material or the like, through a method such as comma coating, gravure coating, micro-gravure coating, or slot die head coating to have a thickness ranging from 10 to 500 μm.

The colored layer 35 is formed by coating an adhesive synthetic resin such as polyurethane, poly ethylene vinyl acetate copolymer (EVA copolymer), polyester, ABS, a polyacryl copolymer and the like, through a method such as comma coating, gravure coating, micro-gravure coating, or slot die head coating. The colored layer 35 is formed to be thicker in the non-reflective region NRA2 than in the reflective region RA2 to have a step. Thus, the colored layer 35 has an concave-convex surface, and a concave portion of the surface of the colored layer 35 is the reflective region RA2 and a convex portion of the surface of the colored layer 35 is the non-reflective region NRA2. The colored layer 35 is formed to have a thickness ranging from 100 to 500 μm in the non-reflective region NRA2.

The colored layer 35 selectively includes a fluorescent material including fluorescent dye and fluorescent pigment or a phosphorescent material including phosphorescent dye and phosphorescent pigment. Also, the colored layer 35 may include the fluorescent material and the phosphorescent material together. Thus, when the colored layer 35 emits light according to a fluorescent operation at night, or absorbs light in the daytime or indoor light, stores it, and emits light at night, thereby enhancing visibility at night or in a dark place. Moreover, when the colored layer 35 includes the fluorescent material and the phosphorescent material together, the colored layer 35 may simultaneously perform fluorescent operation and a phosphorescent operation. Emitted light has red (R) color, green (G) color, or blue (B) color or the like according to a mixed fluorescent material or phosphorescent material.

The light reflective member 45 includes a reflective layer 37 and a light concentrating layer 41, and is formed on a concave portion on the surface of the colored layer 35. Since the reflective layer 37 is formed on a lower surface of the light concentrating layer 41 so as to be positioned in the concave portion of the reflective region RA2 on the surface of the colored layer 35 and reflects incident light to the outside. The reflective layer 37 may be formed by depositing a metal, such as aluminum (A), silver (Ag), copper (Cu), zinc (Zn), tin (Sn) or the like, having excellent light reflecting characteristics according to a deposition method such as chemical vapor deposition (CVD), sputtering, ion-beam or the like, to have a thickness ranging from 100 to 300□.

The light concentrating layer 41 is formed on the reflective layer 37 to concentrate incident light to the reflective layer 37. The light concentrating layer 41 is formed by sprinkling a plurality of beads 39 made of glass, transparent non-vitreous ceramic, or a transparent synthetic resin having a size ranging from 20 to 200 μm.

The light reflective member 45 consisting of the reflective layer 37 and the light concentrating layer 41 retroreflects light incident to the reflective region RA2 to the outside at night.

The light reflective member 45 consisting of the reflective layer 37 and the light concentrating layer 41 is formed not to have a step with a surface of the colored layer 35 of the non-reflective region NRA2 in the concave portion of the colored layer 35 of the reflective region RA2 on the reflective region RA2. Thus, the light reflective member 45 is prevented from being delaminated from the base 31 when used.

In the retroreflective sheet having the foregoing configuration, the colored layer 35 is formed to be thicker in the non-reflective region NRA2 than in the reflective region RA2 to allow the surface of the colored layer 35 to have a concavo-convex portion by a step, and the light reflective member 45 consisting of the reflective layer 37 and the light concentrating layer 41 is formed on the concave portion of the surface of the colored layer 35 as a reflective region RA2. Since the light reflective member 45 composed of the reflective layer 37 and the light concentrating layer 41 is formed not to have a step with the surface of the colored layer 35 of the non-reflective region NRA2, it is prevented from being delaminated from the base 31 when used.

In the above description, the retroreflective sheet in accordance with an embodiment of the present invention is formed to have the reflective regions RA2 and the non-reflective regions NRA2 alternated in a stripe pattern, but a retroreflective sheet in accordance with another embodiment of the present invention may be formed to have the reflective regions RA2 and the non-reflective regions NRA2 having various types of characters, numbers or shapes.

FIGS. 4A to 4E are views illustrating a process of manufacturing a retroreflective sheet in accordance with an embodiment of the present invention.

Figure 4A:
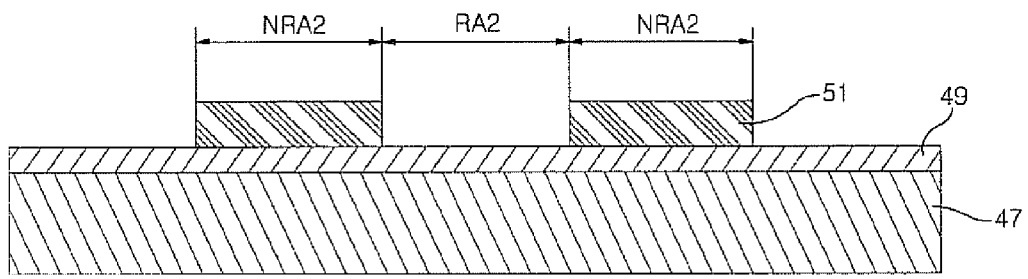
FIGS. 4A to 4E are views illustrating a process of manufacturing a retroreflective sheet in accordance with an embodiment of the present invention.

Referring to FIG. 4A, the bead alignment layer 49 is formed on the carrier film 47. The carrier film 47 is made of a synthetic resin such as polyester or the like. Also, the bead alignment layer 49 is made of a synthetic resin such as poly ethylene vinyl acetate copolymer (EVA copolymer), poly ethylene acrylic acid copolymer (EAA copolymer), polyethylene (LOPE, LLDPE, HDPE), polypropylene copolymer, polyacryl copolymer, or the like.

A mask tape 51 is attached to be alternated in a stripe pattern on the bead alignment layer 49 to confine the reflective region RA2 and the non-reflective region NRA2. A portion in which the mask tape 51 is not attached is the reflective region RA2 and a portion in which the mask tape 51 is attached is a non-reflective region NRA2. The mask tape 51 may be made of a synthetic resin, such as polyester, plastic, biaxial-oriented polypropylene (BOPP), casting polypropylene (CPP) or the like, having thermal stability.

Figure 4B:
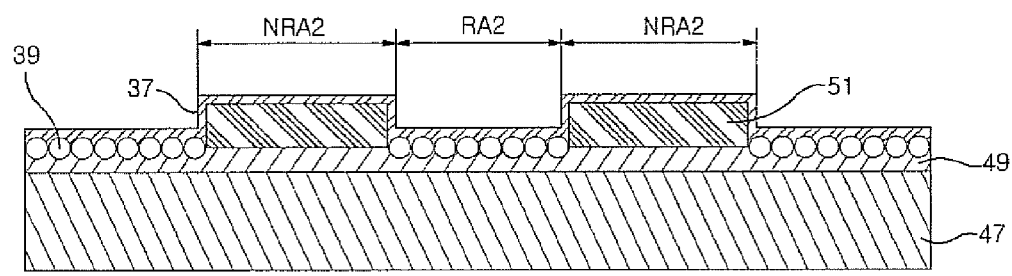

Referring to FIG. 4B, a plurality of beads 39 are sprinkled on the bead alignment layer 49 with the mask tape 51 formed thereon such that the beads form a uniform layer to thus form the light concentrating layer 41. Here, the plurality of beads 39 are fixedly attached to the exposed bead alignment layer 49 having exposed bonding characteristics in the reflective region RA2 and not attached to the mask tape 51 of the non-reflective region NRA2. Thus, the light concentrating layer 41 is formed only in the reflective region RA2. Also, since the plurality of beads 39 are not attached in the non-reflective region NRA2 due to the mask tape 51, an amount of usage is reduced to save a unit cost. The plurality of beads 39 may be made of glass, a transparent non-vitreous ceramic, or a transparent synthetic resin having a size ranging from 20 to 200 μm.

In addition, a metal having excellent light reflecting characteristics is deposited on the entire surface of the foregoing structure, that is, on the surface of the light concentrating layer 41 and the mask tape 51 to form the reflective layer 37. The reflective layer 37 may be formed by performing evaporation, chemical vapor deposition (CVD), sputtering, ion-beam or the like, on a metal such as an aluminum (Al), silver (Ag), copper (Cu), zinc (Zn), tin (Sn) or the like, to have a thickness ranging from 100 to 300□.

Figure 4C:
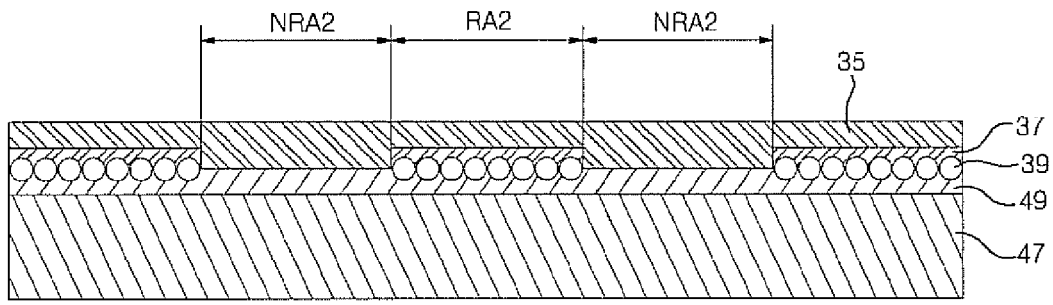

Referring to FIG. 4C, the mask tape 51 attached to extend in a stripe pattern to the non-reflective region NR2 on the colored layer 35 is removed. Here, a portion of the reflective layer 37 formed on the mask tape 51 is also removed together.

Thus, the reflective layer 37 remains in a stripe pattern only on the light concentrating layer 41 in the reflective region RA2, and the reflective layer 37 and the light concentrating layer 41 form the light reflective member 31.

In addition, an adhesive synthetic resin is coated to have a thickness ranging from 100 to 500 μm on the bead alignment layer 49 as the non-reflective region NR2 to form the colored layer 35 such that it covers the light reflective member 45. The colored layer 35 may be formed by coating an adhesive synthetic resin of polyurethane, poly ethylene vinyl acetate copolymer (EVA copolymer), polyester, ABS, or polyacryl copolymer including fluorescent pigment and phosphorescent pigment together through a method such as comma coating, gravure coating, micro-gravure coating, or slot die head coating. The colored layer 35 selectively includes a fluorescent material including fluorescent dye and fluorescent pigment or a phosphorescent material including phosphorescent dye and phosphorescent pigment. Also, the colored layer 35 may include the fluorescent material and the phosphorescent material together.

The colored layer 35 is formed to have a flat surface, while overcoming a step between the bead alignment layer 49 of the non-reflective region NRA2 and the light reflective member 45 composed of the light concentrating layer 41 and the reflective layer 37 in the reflective region RA2.

The colored layer 35 emits light according to a fluorescent operation at night or absorbs light in the daytime or indoor light, stores it, and emits light at night, or fluorescent and phosphorescent operations may be performed simultaneously to thus enhance visibility. Emitted light has red (R) color, green (G) color, or blue (B) color or the like, according to the included fluorescent material or phosphorescent material.

Figure 4D:
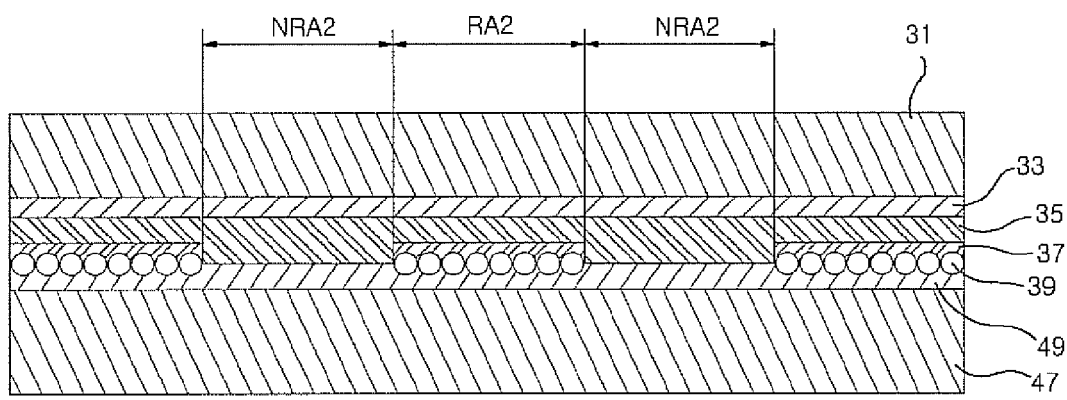

Referring to FIG. 4D, the bonding layer 33 is formed on the colored layer 35. The bonding layer 33 is formed by coating one or a mixture of two or more of synthetic resins having excellent heat resistance and adhesive strength, such as polyester, polyurethane, poly ethylene vinyl acetate copolymer (EVA copolymer), a polyacryl copolymer, PVC, epoxy, olefin-based resin, phenol-based resin and the like, through a method such as comma coating, gravure coating, slot die head coating, or micro-gravure coating to have a thickness ranging from 10 to 500 μm. The bonding layer 33 may include a flame retardant such as $Sb_2O_3$, a phosphonic acid material, a brome-based material, or the like.

The base 31 is thermally compressed to the bonding layer 33. The base 31 is made of flame-retardant all-cotton fiber, glass fiber, aramid fiber, hemp fiber, wool fiber, polyester fiber, or cotton blend (TC) fiber, and the like.

Figure 4E:
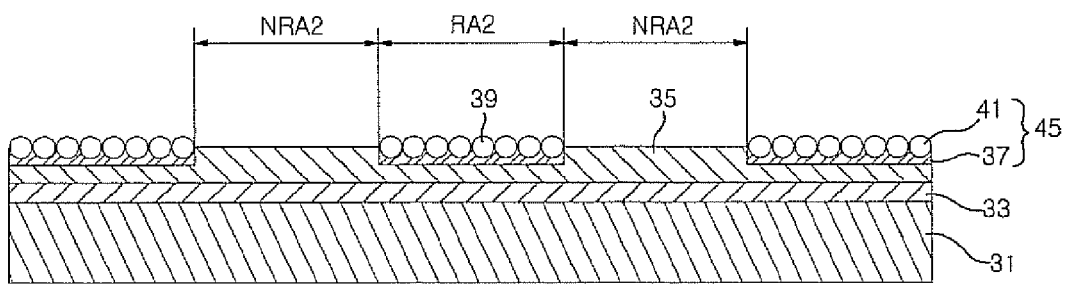

Referring to FIG. 4E, the carrier film 47 is delaminated to be removed. Here, the bead alignment layer 49 is also removed to expose the light concentrating layer 41 of the reflective region RA2 and the colored layer 35 of the non-reflective region NRA2, completing a retroreflective sheet. Since adhesive strength of the colored layer 35 is stronger than that of the bead alignment layer 49, the carrier film 47 is easily delaminated, and here, the plurality of beads 39 are prevented from being separated together.

In the above description, the retroreflective sheet in accordance with the embodiment of the present invention is formed to have the reflective region RA2 and the non-reflective region NRA2 alternated in a stripe pattern, but a retroreflective sheet in accordance with another embodiment of the present invention may be formed to have the reflective regions RA2 and the non-reflective regions NRA2 having various types of characters, numbers or shapes.

Thus, since a step is not generated between the reflective region and the non-reflective region, the light reflective member can be prevented from being delaminated from the body when used, and also, the light reflective member can be simply formed in the reflective region of the colored layer.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A retroreflective sheet, comprising:
a base including a non-reflective region and a reflective region;
a bonding layer formed over the base in the non-reflective region and the reflective region;
a colored layer formed over the bonding layer in the non-reflective region and the reflective region, wherein the colored layer formed in the non-reflective region is thicker than the colored layer formed in the reflective region to have a concave-convex surface, wherein the colored layer has a fluorescent function or a phosphorescent function or having the both fluorescent and phosphorescent functions, wherein the concave is formed in the reflective region and the convex is formed in the non-reflective region;
a reflective layer formed over the colored layer in the reflective region; and
a light concentrating layer having a plurality of beads and formed over the reflective layer.

2. The retroreflective sheet of claim 1, wherein the bonding layer includes polyester, polyurethane, a poly ethylene vinyl acetate copolymer (EVA), a polyacryl copolymer, PVC, epoxy, an olefin-based resin, or an phenol-based resin and has bonding characteristics.

3. The retroreflective sheet of claim 2, wherein the bonding layer further includes a flame retardant,
wherein the flame retardant includes $Sb_2O_3$, a phosphonic acid material, or a brome-based material.

4. The retroreflective sheet of claim 1, wherein the colored layer includes an adhesive synthetic resin,
wherein the adhesive synthetic resin includes polyurethane, a poly ethylene vinyl acetate copolymer (EVA copolymer), polyester, ABS, or a polyacryl copolymer.

5. The retroreflective sheet of claim 4, wherein the colored layer further includes a fluorescent material or a phosphorescent material.

6. The retroreflective sheet of claim 4, wherein the colored layer further includes a fluorescent material and a phosphorescent material.

7. The retroreflective sheet of claim 1, wherein the reflective region and the non-reflective region are arranged in an alternated manner and each of which is in a stripe pattern.

8. The retroreflective sheet of claim 1, wherein the colored layer is formed to have a thickness ranging from 100 to 500 μm in the non-reflective region.

* * * * *